(No Model.)

F. G. BIPPUS.
SIDE BAR VEHICLE.

No. 281,962. Patented July 24, 1883.

Attest:
Wm. J. Danner
B. W. Hopkins

Inventor:
Ferdinand G. Bippus,
By Knight Bros
Att'ys

UNITED STATES PATENT OFFICE.

FERDINAND G. BIPPUS, OF HENDERSON, KENTUCKY, ASSIGNOR TO GEORGE DELKER AND THE DELKER PHAETON COMPANY, OF SAME PLACE.

SIDE-BAR VEHICLE.

SPECIFICATION forming part of Letters Patent No. 281,962, dated July 24, 1883.

Application filed February 20, 1883. (No model.)

*To all whom it may concern:*

Be it known that I, FERDINAND GOTTLIEB BIPPUS, a citizen of the United States, residing at Henderson, in the county of Henderson and State of Kentucky, have invented a new and useful Improvement in Side-Bar Vehicles, of which the following is a specification.

My invention relates to that class of vehicles known as "side-bar" vehicles and "side-spring-gear" vehicles; and it consists in placing drop-reach on or below the level of the forward axle and extending a brace rearwardly therefrom, the said brace having a boss which forms the pivot-point of the axle. By these means I permit the turning of the vehicle in a much smaller space than usual, and by the arrangement of the drop-reach, as described, I prevent the box from striking against said reach when the vehicle is in motion. I also secure to the top of the front axle the lower wear-iron, or lower section of the fifth-wheel, whose circumference is concentric with the aforesaid pivot-point. Secured to the lower side of the head-block is the upper wear-iron, or upper section of the fifth-wheel, which has on its forward periphery a downwardly and rearwardly projecting lug or lip which engages over the periphery of the lower wear-iron, and thus prevents their separation, which would result from the rocking of the body forward and backward. A brace is secured to the head-block, extending rearward and downward in an oblique direction along the upper side of the reach, to which latter it is also securely bolted. At the pivot-point it is provided with an eye, through which the pivot-pin or king-bolt passes, and thence through the boss in the lower brace.

In order that my invention may be fully understood, I will proceed to describe it with reference to the accompanying drawings, in which—

Figure 1:
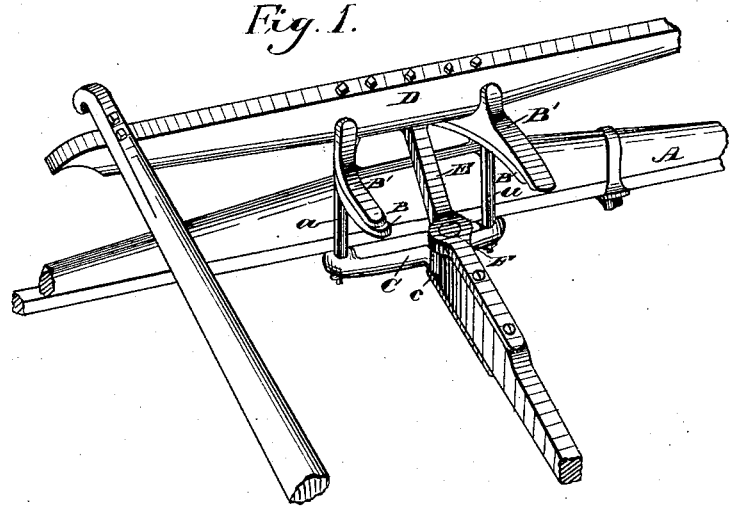
Figure 2:
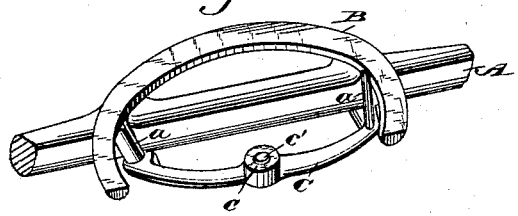
Figure 3:
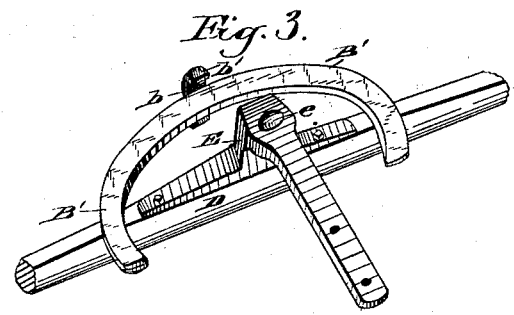

Figure 1 is a perspective view of the device applied to a side-bar vehicle in which a reach is employed. Fig. 2 is a perspective view of the lower wear-iron and bracket. Fig. 3 is a perspective view of the under side of the upper wear-iron and bracket.

A represents the front axle of a vehicle, to which is attached, by clips $a$, formed in one with a lower wear-iron, B, a rearwardly-projecting brace or bracket, C, which is provided with a boss, $c$, at the pivot-point, or the center on which the front axle turns. The lower wear-iron, or lower section of the fifth-wheel, B, whose circumference is concentric with the pivot-point, is secured to the upper side of the axle A by the same clip, $a$, which secures the supporting-bracket C to the lower side of said axle, said clip being formed in one with the wear-iron for adding strength to the lower brace or bracket, C.

On the lower side of the reach R is attached a brace, $r$, upon which the boss $c$ of the brace C rests.

To the head-block D is secured a bracket, E, which extends rearwardly and downwardly in an oblique direction to the pivot-point, where it is provided with an eye, $e$, for the reception of the pivot-pin or king-bolt F, which also passes through an eye, $e'$, in the boss $c$, formed on the bracket C, and through the brace $r$ of the reach. The bracket E extends backward in a horizontal direction along the upper side of said reach, and is securely bolted thereto.

To the under side of the head-block D is also secured the upper wear-iron, B', on whose forward periphery is formed a downwardly-projecting lug, $b$, which has a rearwardly-projecting arm, $b'$, which engages over the periphery of the lower wear-iron, B, and prevents their separation, which is due to the rocking of the body of the vehicle.

I am aware that it is not new to provide the pivotal point in rear of the front axle, and I do not claim this feature, broadly, but limit myself to the construction shown and described, and which I have found by experience to be peculiarly adapted to side-bar vehicles.

Having thus described my invention, the following is what I claim as new therein and desire to secure by Letters Patent:

1. In a side-bar vehicle, the combination of the drop-reach placed on or below the level of the axle, as described, with a brace projecting rearwardly from the axle, and provided with a boss constituting the pivotal point for said axle, and a brace connected to the under side of the reach, and the wear-irons formed concentrically with the pivot-point, as and for the purposes set forth.

2. In a side-bar vehicle, the combination of the drop-reach having a brace, C, placed on or below the level of the axle, as described, with a head-block, D, the bracket E, extending rearwardly and downwardly along the upper side of the drop-reach, the wear-irons B and B', clips $a$, formed in one with the lower wear-iron, and the rearwardly-projecting brace C, provided with a boss, $c$, all substantially as and for the purposes set forth.

FERDINAND GOTTLIEB BIPPUS.

Witnesses:
GEORGE DELKER,
HENRY W. LINK.